United States Patent
Yu et al.

(10) Patent No.: US 9,520,974 B2
(45) Date of Patent: Dec. 13, 2016

(54) INTERFERENCE MEASUREMENT METHOD AND APPARATUS FOR NEW CARRIER TYPE

(71) Applicant: Samsung Electronics Co., Ltd., Gyeonggi-do (KR)

(72) Inventors: Hyoungyoul Yu, Seoul (KR); Younsun Kim, Gyeonggi-do (KR); Hyojin Lee, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 511 days.

(21) Appl. No.: 14/193,500

(22) Filed: Feb. 28, 2014

(65) Prior Publication Data

US 2014/0241191 A1 Aug. 28, 2014

(30) Foreign Application Priority Data

Feb. 28, 2013 (KR) .......................... 10-2013-0022226

(51) Int. Cl.
*H04L 5/00* (2006.01)

(52) U.S. Cl.
CPC ............. *H04L 5/005* (2013.01); *H04L 5/0073* (2013.01); *H04L 5/0082* (2013.01); *H04L 5/0092* (2013.01); *H04L 5/0023* (2013.01)

(58) Field of Classification Search
CPC ...... H04L 5/0048; H04L 5/005; H04L 5/0058; H04L 5/0073; H04L 5/0078; H04L 5/0082; H04L 5/0091; H04L 5/0092
See application file for complete search history.

(56) References Cited

U.S. PATENT DOCUMENTS

| | | | | |
|---|---|---|---|---|
| 2013/0301565 A1* | 11/2013 | Xu | ....................... | H04W 72/048 370/329 |
| 2013/0343301 A1* | 12/2013 | Geirhofer | ............... | H04L 5/001 370/329 |
| 2014/0334457 A1* | 11/2014 | Tiirola | .................. | H04L 5/0096 370/336 |
| 2015/0117338 A1* | 4/2015 | Janis | ..................... | H04L 5/0051 370/329 |
| 2015/0304995 A1* | 10/2015 | Yi | ........................... | H04L 5/001 370/329 |
| 2015/0358094 A1* | 12/2015 | Yi | ........................ | H04B 17/318 370/252 |
| 2016/0081111 A1* | 3/2016 | Yi | ........................... | H04L 5/001 370/280 |
| 2016/0128030 A1* | 5/2016 | Tiirola | .................. | H04L 5/0096 370/336 |

* cited by examiner

*Primary Examiner* — Feben M Haile

(74) *Attorney, Agent, or Firm* — The Farrell Law Firm, P.C.

(57) ABSTRACT

An Interference Measurement Resource (IMR) allocation method and apparatus for allocating resources for efficient interference measurement in a downlink in a system supporting a New Carrier Type (NCT) is provided. The interference measurement configuration method of a base station transmitting subframes including, or not including, Cell-specific Reference Signals (CRS) in a wireless communication system includes determining whether a terminal supports a New Carrier Type (NCT) subframe, allocating, when the terminal supports the NCT subframe, Interference Measurement Resources (IMR) to the terminal at Resource Elements (REs) where other signals are not mapped in the subframe, transmitting information on the allocated IMR to the terminal, and transmitting the subframe including the allocated IMR to the terminal.

20 Claims, 19 Drawing Sheets

INTERFERENCE MEASUREMENT METHOD AND APPARATUS FOR NEW CARRIER TYPE

PRIORITY

This application claims priority under 35 U.S.C. §119(a) to a Korean Patent Application No. 10-2013-0022226, which was filed in the Korean Intellectual Property Office on Feb. 28, 2013, the entire content of which is incorporated herein by reference.

BACKGROUND

1. Field of the Invention

The present invention generally relates to an interference measurement method and apparatus for a new carrier type and, more particularly, to an Interference Measurement Resource (IMR) allocation method and apparatus for efficient interference measurement in a downlink in a system supporting a New Carrier Type (NCT).

2. Description of the Related Art

Mobile communication systems have evolved into high-speed, high-quality wireless packet data communication systems to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in 3rd Generation Partnership Project (3GPP), High Rate Packet Data (HRPD) defined in 3rd Generation Partnership Project-2 (3GPP2), and 802.16 defined in IEEE, have been developed to support the high-speed, high-quality wireless packet data communication services. Particularly, LTE is a communication standard developed to support high speed packet data transmission and to maximize the throughput of the radio communication system with various radio access technologies. LTE-A is the evolved version of LTE to improve the data transmission capability.

Typically, LTE base stations and terminals are based on 3GPP Release 8 or 9 while LTE-A base stations and terminals are based on 3GPP Release 10. The 3GPP standard organization is specifying the next release for more improved performance beyond LTE-A.

The existing 3rd and 4th Generation wireless packet data communication systems (such as HSDPA, HSUPA, HRPD, and LTE/LTE-A) adopt Adaptive Modulation and Coding (AMC) and Channel-Sensitive Scheduling techniques to improve the transmission efficiency. AMC allows the transmitter to adjust the data amount to be transmitted according to the channel conditions. That is, the transmitter is capable of decreasing the data transmission amount for bad channel conditions so as to fix the received signal error probability at a certain level, or increasing the data transmission amount for good channel conditions so as to transmit large amounts of information efficiently while maintaining the received signal error probability at an intended level. Meanwhile, the channel sensitive scheduling technique allows the transmitter to serve the user having a good channel condition selectively among a plurality of users so as to increase the system capacity as compared to allocating a channel fixedly to serve a single user. This increase in system capacity is referred to as multi-user diversity gain.

When using AMC along with a Multiple Input Multiple Output (MIMO) transmission scheme, it may be necessary to take into consideration a number of spatial layers and ranks for transmitting signals. In this case, the transmitter determines the optimal data rate in consideration of the number of layers for use in MIMO transmission.

Recently, research has been conducted to replace Code Division Multiple Access (CDMA) used in the legacy 2nd and 3rd mobile communication systems with Orthogonal Frequency Division Multiple Access (OFDMA) for the next generation mobile communication system. The 3GPP and 3GPP2 are in the middle of the standardization of an OFDMA-based evolved system. OFDMA is expected to provide superior system throughput as compared to CDMA. One of the main factors that allows OFDMA to increase system throughput is frequency domain scheduling capability. As channel sensitive scheduling increases the system capacity using a time-varying channel characteristic, OFDM can be used to obtain more capacity gain using a frequency-varying channel characteristic.

In the OFDMA-based LTE/LTE-A system, control signals such as Physical Downlink Control CHannel (PDCCH), Physical Hybrid Automatic Repeat reQuest Indicator CHannel (PHICH), Physical Control Format Indicator CHannel (PCFICH), and Common Reference Signal occupy a relatively large portion of radio resources. This results in an issue of control signal overhead, power consumption, and resource shortage. The New Carrier Type (NCT) is a technology introduced to minimize the control channel and reference signal overhead and has drawn attention as a promising technology for improving network data throughput and power utilization efficiency in the complex mobile communication environment where macro and small cells coexist.

Typically, a cellular radio mobile communication system is comprised of a plurality of cells distributed within an area. Each cell is centered around a base station responsible for communication with mobile devices or terminals. The base station includes antennas and a signal processing part for providing mobile communication services to the terminals within the cell. Such a system in which the antennas are placed at the center of the cell is referred to as Centralized Antenna System (CAS) and is typical in a normal mobile communication system. In contrast, a system in which the antennas are distributed in the range of the service area of the cell is referred to as Distributed Antenna System (DAS) and is advantageous in providing improved mobile communication service as compared to the CAS.

In an LTE/LTE-A system, Interference Measurement Resource (IMR) is used to improve interference measurement accuracy for DAS as well as CAS. In this way, the LTE/LTE-A system increases the mobile data throughput. Recently, in order to meet the increasing demand for mobile data service, mobile carriers are introducing small cell technology to distribute the data traffic. The introduction of the small cell technology is advantageous to distribute data traffic so as to reduce the load of the network, but also causes problems such as increased control and interference signal overhead.

The LTE-A Release 12 introduces New Carrier Type (NCT) to reduce control channel and common reference signal overhead, thereby improving radio resource utilization efficiency. The NCT is promising for improved radio resource utilization in the network environment where the small and macro cells coexist.

SUMMARY

The present invention has been made to address at least the problems and disadvantages described above and to provide at least the advantages described below. Accordingly, an aspect of the present invention provides an interference measurement resource structure and resource allocation method and apparatus for improving interference measurement accuracy in a network environment supporting NCT where macro cells exist with or without any small cells.

In accordance with an aspect of the present invention, an interference measurement configuration method of a base station transmitting subframes including, or not including, Cell-specific Reference Signals (CRS) in a wireless communication system is provided. The interference measurement configuration method includes determining whether a terminal supports a New Carrier Type (NCT) subframe, allocating, when the terminal supports the NCT subframe, Interference Measurement Resources (IMR) to the terminal at Resource Elements (REs) where other signals are not mapped in the subframe, transmitting information on the allocated IMR to the terminal, and transmitting the subframe including the allocated IMR to the terminal.

In accordance with another aspect of the present invention, an interference measurement method of a terminal receiving subframes including, or not including, Cell-specific Reference Signals (CRS) in a wireless communication system is provided. The interference measurement method includes determining whether a base station supports a New Carrier Type (NCT) subframe, receiving information on Interference Measurement Resources (IMR) from the base station at Resource Elements (REs) where other signals are not mapped in the subframe, receiving the subframe including the allocated IMR from the base station, measuring interference using the IMR, and reporting a measurement report to the base station.

In accordance with another aspect of the present invention, a base station for transmitting interference measurement in a wireless communication system using subframes including, or not including, Cell-specific Reference Signals (CRS) is provided. The base station includes a radio communication unit which transmits and receives subframes to and from a terminal and a controller which controls determining whether a terminal supports a New Carrier Type (NCT) subframe, allocating, when the terminal supports the NCT subframe, Interference Measurement Resources (IMR) to the terminal at Resource Elements (REs) where other signals are not mapped in the subframe, transmitting information on the allocated IMR to the terminal, and transmitting the subframe including the allocated IMR to the terminal.

In accordance with an aspect of the present invention, a terminal for measuring interference in a wireless communication system using subframes including, or not including, Cell-specific Reference Signals (CRS) is provided. The terminal includes a radio communication unit which transmits and receives subframes to and from a base station and a controller which controls determining whether a base station supports a New Carrier Type (NCT) subframe, receiving information on Interference Measurement Resources (IMR) from the base station at Resource Elements (REs) where other signals are not mapped in the subframe, receiving the subframe including the allocated IMR from the base station, measuring interference using the IMR, and reporting a measurement report to the base station.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described with reference to the accompanying drawings in detail. A detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied to other communication systems having a similar technical background and channel format, with a slight modification, without departing from the spirit and scope of the present invention.

Figure 1:
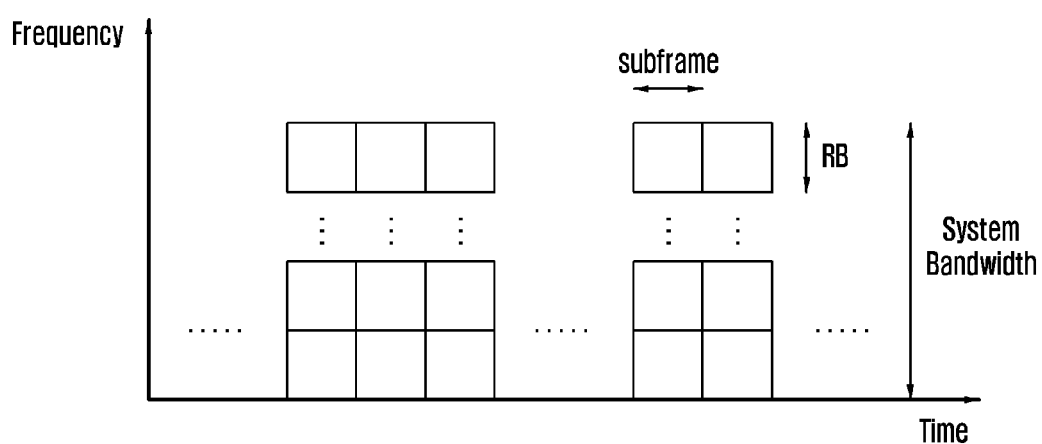
FIG. 1 is a graph illustrating a relationship between time and frequency resources in an LTE/LTE-A system.

FIG. 1 is a graph illustrating a relationship between time and frequency resources in LTE/LTE-A system.

As shown in FIG. 1, the radio resource for transmission from the evolved Node B (eNB) to a User Equipment (UE) is divided into Resource Blocks (RBs) in the frequency domain and subframes in the time domain. In the LTE/LTE-A system, an RB consists of 12 consecutive carriers and occupies 180 kHz bandwidth in general. Meanwhile, a subframe consists of 14 OFDM symbols and spans 1 msec. The LTE/LTE-A system allocates resources for scheduling in units of subframes in the time domain and in units of RBs in the frequency domain.

Figure 2:
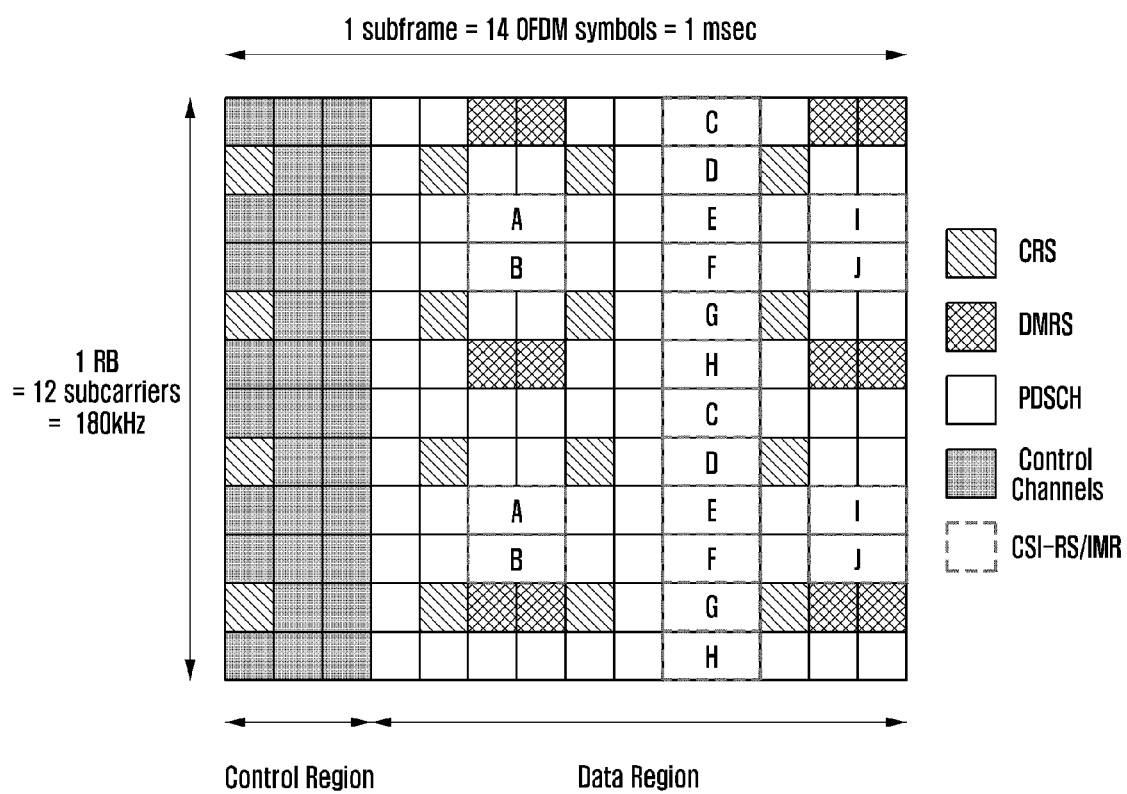
FIG. 2 is a time-frequency grid illustrating a single resource block of a downlink subframe as a smallest scheduling unit in the LTE/LTE-A system.

FIG. 2 is a time-frequency grid illustrating a single resource block of a downlink subframe as a smallest scheduling unit in the LTE/LTE-A system.

As shown in FIG. 2, the radio resource consists of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource structured as shown in FIG. 2 can be used for transmitting plural different types of signals as follows.

1. CRS (Cell-specific Reference Signal): reference signal transmitted to all the UEs within a cell
2. DMRS (DeModulation Reference Signal): reference signal transmitted to a specific UE
3. PDSCH (Physical Downlink Shared CHannel): data channel transmitted in the downlink which the eNB uses to transmit data to the UE and mapped to REs not used for reference signal transmission in the data region of FIG. 2
4. CSI-RS (Channel Status Information Reference Signal): reference signal transmitted to the UEs within a cell and used for channel state measurement. Multiple CSI-RSs can be transmitted within a cell.
5. Other control channels (PHICH, PCFICH, PDCCH): channels for providing control channel necessary for the UE to receive PDCCH and transmitting ACK/NACK of HARQ operation for uplink data transmission In addition to the above signals, muting may be configured in order for the UEs within the corresponding cells to receive the CSI-RSs transmitted by different eNBs in the LTE-A system. The muting can be mapped to the positions designated for CSI-RS, and the UE receives the traffic signal skipping the corresponding radio resource in general. In the LTE-A system, muting is referred to as zero power CSI-RS (ZP CSI-RS). The ZP CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of antennas transmitting CSI-RS. Also, the ZP CSI-RS (muting) can be mapped to some of the positions A, B, C, D, E, F, G, H, I, and J. The CSI-RS can be mapped to 2, 4, or 8 REs according to the number of antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case where an eNB with one transmit antenna transmits the reference signal to a UE with one receive antenna, the UE has to determine energy per symbol that can be received in the downlink and an interference amount that may be received for the duration of receiving the corresponding symbol to calculate Es/Io from the received reference signal. The calculated Es/Io is reported to the eNB such that the eNB determines the downlink data rate for the UE.

Figure 3:
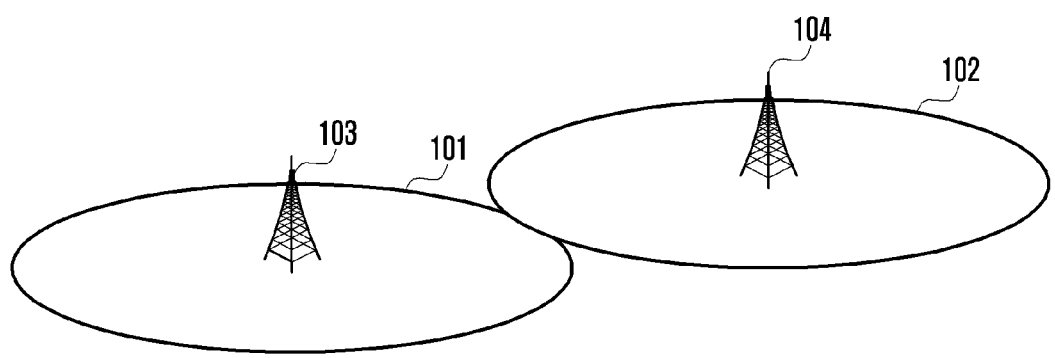
FIG. 3 is a schematic diagram illustrating a mobile communication system based on CAS.

FIG. 3 is a schematic diagram illustrating a mobile communication system based on CAS.

Referring to FIG. 3, the CAS-based mobile communication system is composed of cells 101 and 102 centered around the base stations 103 and 104 respectively. The base stations 103 and 104 provide the terminals with the mobile communication service using one or more antennas. Such a mobile communication system comprised of cells of which each includes the antennas arranged at the same place is referred to as CAS-based mobile communication system.

Figure 4:
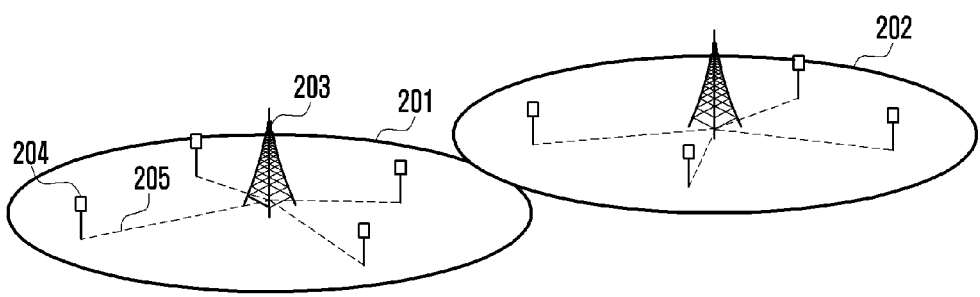
FIG. 4 is a diagram illustrating a mobile communication system based on a distributed antenna system.

FIG. 4 is a diagram illustrating a mobile communication system based on a distributed antenna system.

In FIG. 4, there are distributed antenna system-based cells 201 and 202. The cell 201 includes five antennas including one high power transmission antenna 203 and four low power antennas 204. The high power transmission antenna 203 is capable of providing at least minimum service within the coverage area of the cell while the low power antennas 204 are capable of providing UEs with a high data rate service within a restricted area. The low and high power transmission antennas are all connected to a central controller and operate in accordance with the scheduling and radio resource allocation of the central controller. In the distributed antenna system, one or more antennas may be deployed at one geometrically separated antenna position. In the distributed antenna system, the antenna(s) deployed at the same position is referred to as Remote Radio Head (RRH) group.

As described above, the mobile communication system comprised of the cells in which the RRHs are distributed in the service area of each cell is referred to as a Distributed Antenna System (DAS).

In the distributed antenna system as depicted in FIG. 4, the UE receives signals from one geometrically distributed antenna group and regards the signals from other antenna groups as interference.

Figure 5:
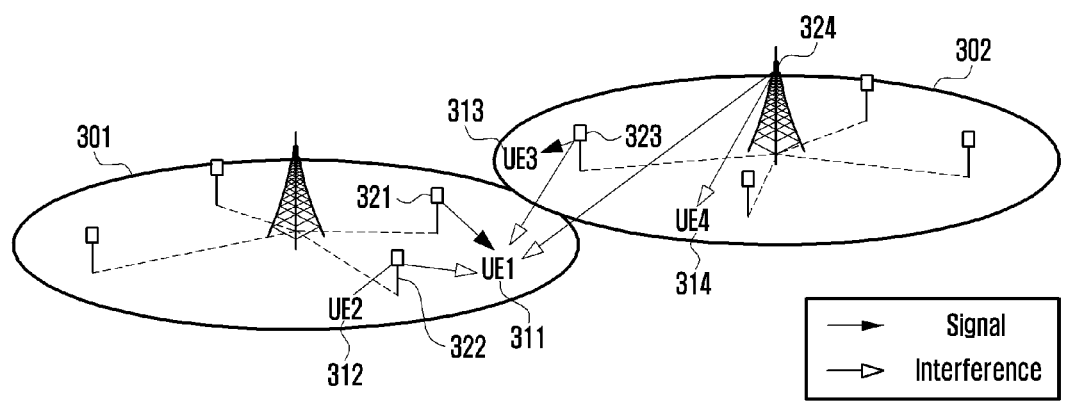
FIG. 5 is a diagram illustrating a situation of interference between antenna groups transmitting different UEs in the conventional distributed antenna system.

FIG. 5 is a diagram illustrating a situation of interference between antenna groups transmitting to different UEs in the conventional distributed antenna system.

In FIG. 5, the UE1 311 is receiving traffic signals from the antenna group 321. Meanwhile, the UE2 312, UE3 313, and UE4 314 are receiving traffic signals from antenna groups 322, 323, and 324, respectively. The UE1 311 which is receiving the traffic signal from the antenna group 321 is influenced by the interference of the other antenna groups transmitting traffic signals to other UEs. That is, the signals transmitted the antenna groups 322, 323, and 324 cause interference to UE1 311.

Typically, in the distributed antenna system, the interference caused by other antenna groups is classified into two categories:

1. Inter-cell interference: interference caused by antenna groups of other cells
2. Intra-cell interference: interference caused by antenna groups of same cell In FIG. 5, the UE1 311 undergoes intra-cell interference from the antenna group 322 of the same cell and inter-cell interference from the third antenna group 323 and the fourth antenna 324 of the neighbor cell. The inter-cell interference and the intra-call interference influence the data channel reception of the UE simultaneously.

In order for the DAS-capable UE to receive the downlink signal at the optimal data rate, it is necessary to measure the inter-cell interference and intra-cell interference accurately and compare these with the received signal strength to request the eNB for the data rate based on the comparison result.

Unlike DAS, Centralized Antenna System (CAS) has only one antenna group per cell. In this case, there does not exist intra-cell interference caused by other antenna groups within the same cell, but only inter-cell interference caused by the antenna groups of neighbor cells.

In the case where the LTE/LTE-A system is implemented based on CAS, it is possible to measure the inter-cell interference using the CRS described with reference to FIG. 2. Typically, in the DAS-based system, the UE performs Inverse Fast Fourier Transform (IFFT) on the CRS having periodic characteristics in frequency domain to generate a delay domain signal.

Figure 6:
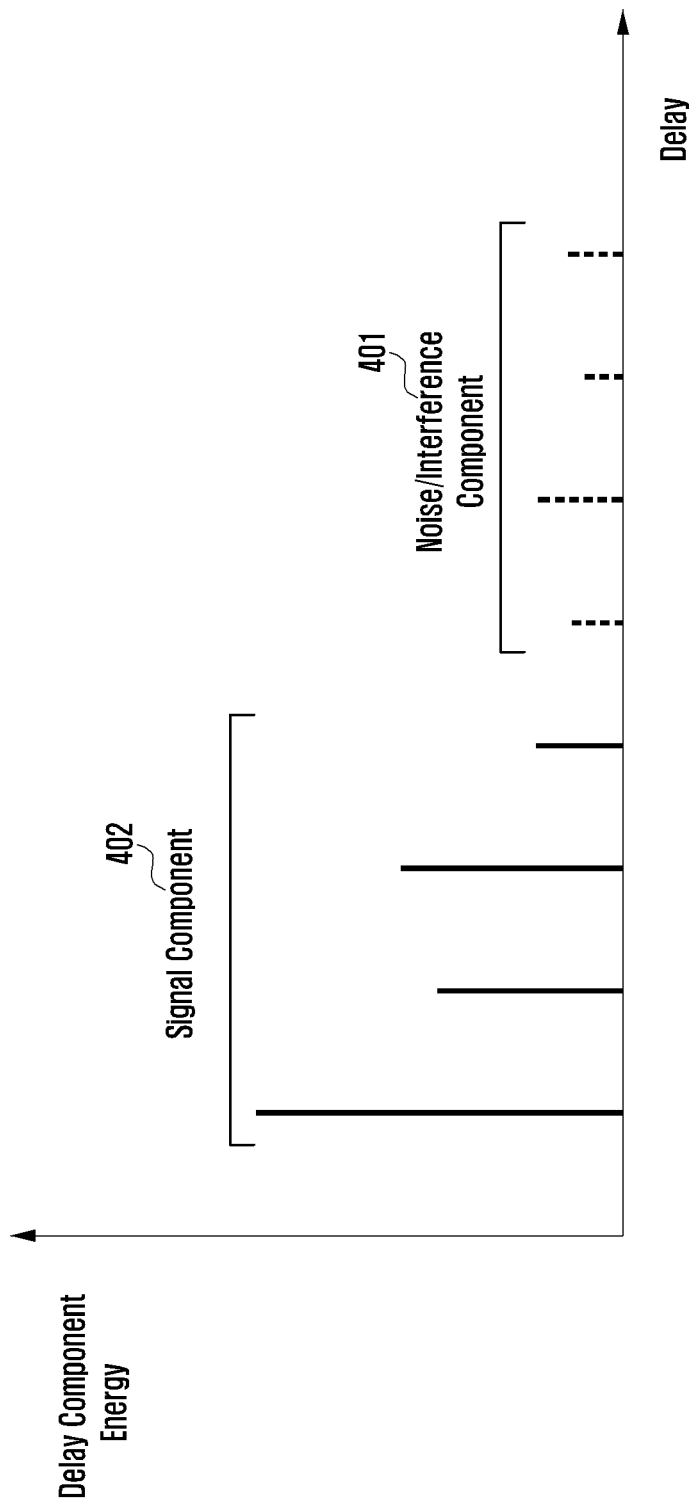
FIG. 6 is a graph illustrating delay domain signals converted from CRS.

Detailed description thereof is made with reference FIG. 6, which is a graph illustrating delay domain signals converted from CRS.

In the LTE/LTE-A system, if the signal is converted to a delay domain signal through IFFT, it is possible to acquire the channel impulse response having the tendency in which the energy carried by the delay component decreases as the delay increases as shown in FIG. 6. Typically, the tail part of the signal acquired through IFFT corresponds to the interference caused by the antenna of the other cell while the head part of the signal corresponds to the actual signal component 402 of CRS. In this case, the UE is capable of calculating the Signal to Noise ratio 401 by measuring the size of the interference at the tail part.

Such an interference measurement is possible because different cells transmit different CRSs. Since the different cells transmit CRSs using different frequency-time resources and the cells apply unique scrambling codes, the above interference measurement is possible. In the case of LTE/LTE-A, the scrambling of the CRS is determined by the Cell ID of the corresponding cell.

In the DAS-based LTE/LTE-A system, however, all antenna groups of the same cell transmit the CRS at the same timing and cannot apply unique scrambling CRSs. If the different antenna groups of the same cell cannot transmit unique CRSs, although the inter-cell interference amount from the antenna groups of the neighbor eNBs can be measured, it is impossible to measure the intra-cell interference from other antenna groups of the same cell.

Figure 7:
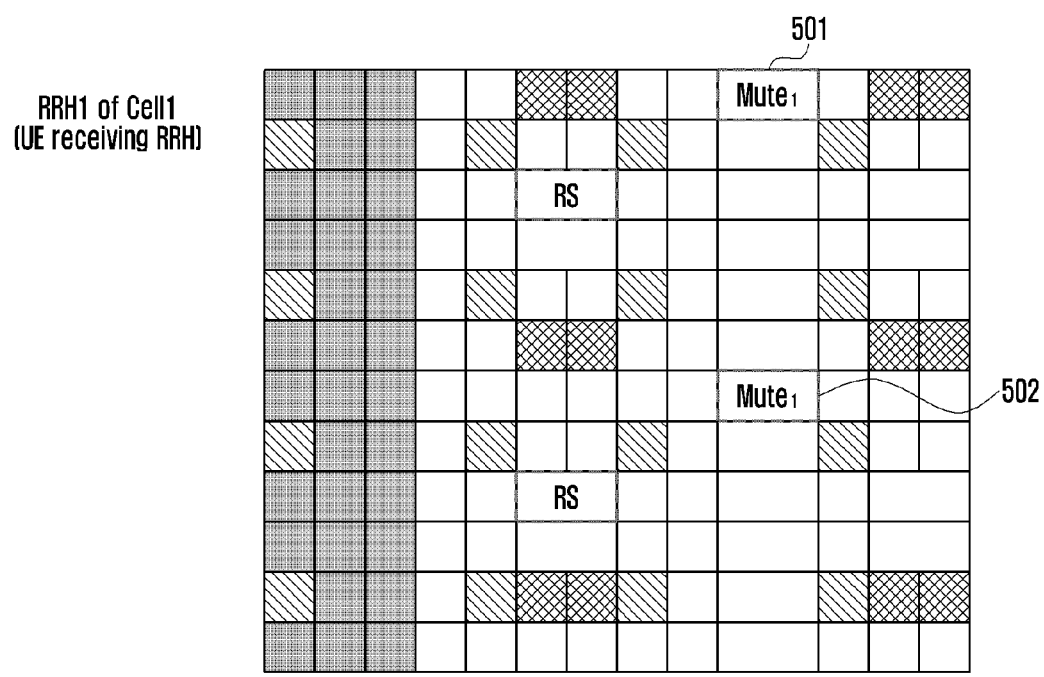
FIG. 7 is a diagram illustrating a radio resource structure for transmission to a terminal using an antenna group in the LTE/LTE-A system

FIG. 7 is a diagram illustrating a radio resource structure for transmission to a terminal using an antenna group in the LTE/LTE-A system.

FIG. 7 shows a radio resource structure for transmission to the first UE1 311 using the first antenna group 321 in the mobile communication system shown in FIG. 5. At this time, the radio resource corresponds to one RB in the frequency domain and one subframe in the time domain.

In the case of measuring the interference amount according to the method described with reference to FIGS. 5 and 6, the terminal measures only the interference occurred by the antenna groups 323 and 324 of the other cell but not the interference occurred by the antenna group 322 in the same cell, resulting in an inaccurate Signal-to-Interference Ratio (SIR). The inaccurate SIR causes performance degradation in the LTE/LTE-A system in which the downlink data rate is indicated by the Adaptive Modulation and Coding (AMC) level determined based on the Signe-to-Interference ratio.

Accordingly, it is necessary to measure the interference caused by the antenna groups in the same cell which allocates interference measurement resources 501 and 502 as shown in FIG. 7 in the system including a plurality base stations or heterogeneous networks.

The interference measurement resource denotes the resource reserved for CSI-RS transmission of the transmit antenna group but muted for use in measurement of the interference signal at the terminal. The interference measurement resources 501 and 502 allocated to the terminal carries no signal of the transmit antenna group but the interference signal transmitted by other antenna groups of the serving cell of the terminal and neighbor cells. Accordingly, the terminal measures the power of the signal received on the interference measurement resources 501 and 502 so as to acquire the information on the interference occurred by the antenna groups of other cells as well as the antenna groups in the same cell.

Figure 8A:
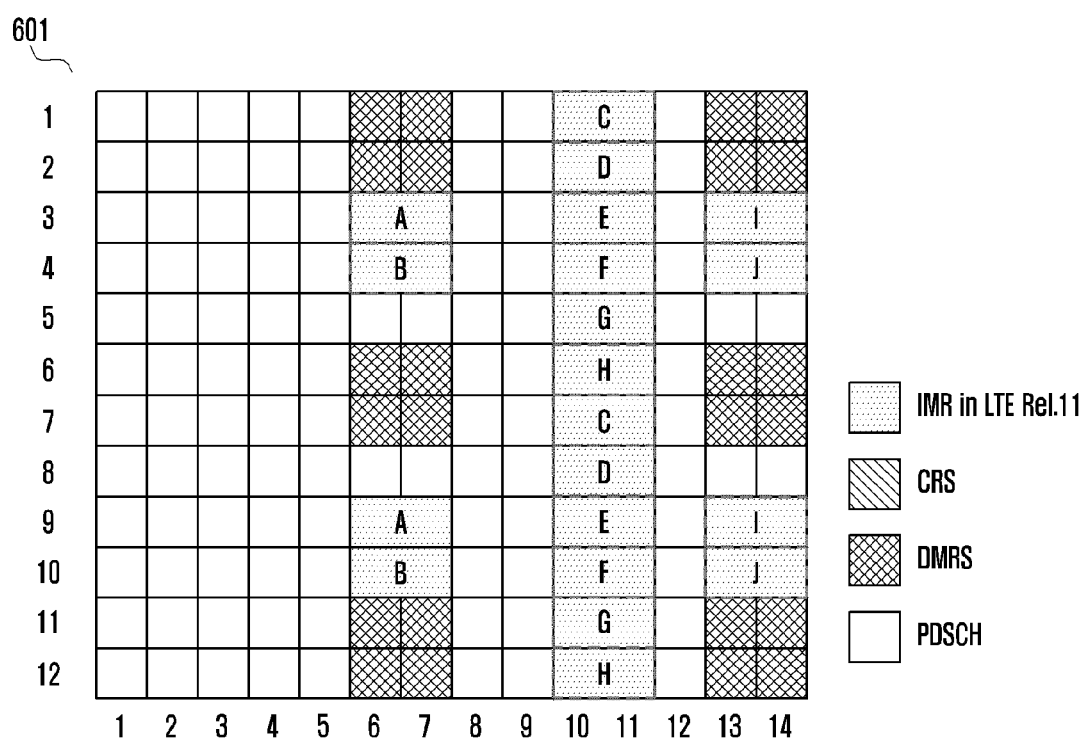
FIGS. 8A and 8B are diagrams illustrating the radio resource structures for New Carrier Type (NCT) according to an embodiment of the present invention.
Figure 8B:
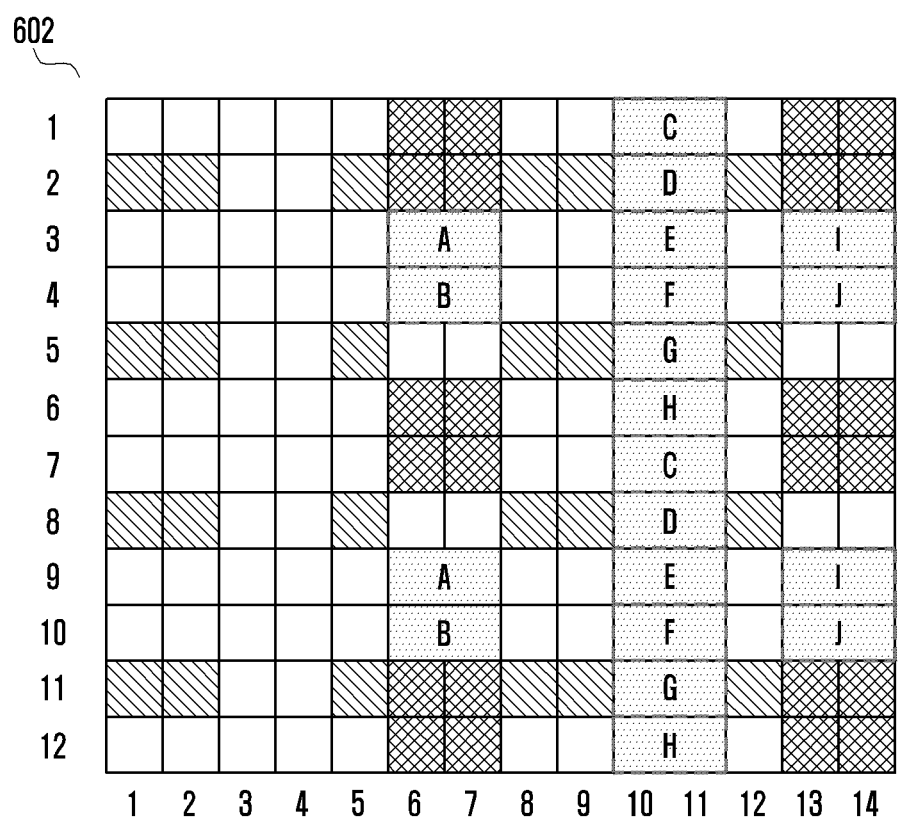

FIGS. 8A and 8B are diagrams illustrating the radio resource structures for New Carrier Type (NCT) according to an embodiment of the present invention. In detail, FIG. 8A shows the radio resource structure 601 including no CRS, and FIG. 8B shows the radio resource structure 602 including CRS.

The basic unit of the radio resource for NCT is a Resource Block (RB) in the frequency domain and subframe in the time domain. The radio resource structure for NCT consists of 12 subcarriers in the frequency domain and 14 OFDM symbols in the time domain, i.e. total 168 time-frequency resource elements, and this is identical with the RB specified for use in the legacy LTE/LTE-A Rel. 11.

Both the radio resource structures depicted in FIGS. 8A and 8B include CRS, DMRS, PDSCH, and IMR (or CSI-RS). However, the radio resource structure for NCT is configured without a control region corresponding to 1-3 OFDM symbols at the beginning of each subframe in the LTE/LTE-A system, resulting in a reduction of control signal overhead.

Figure 9:
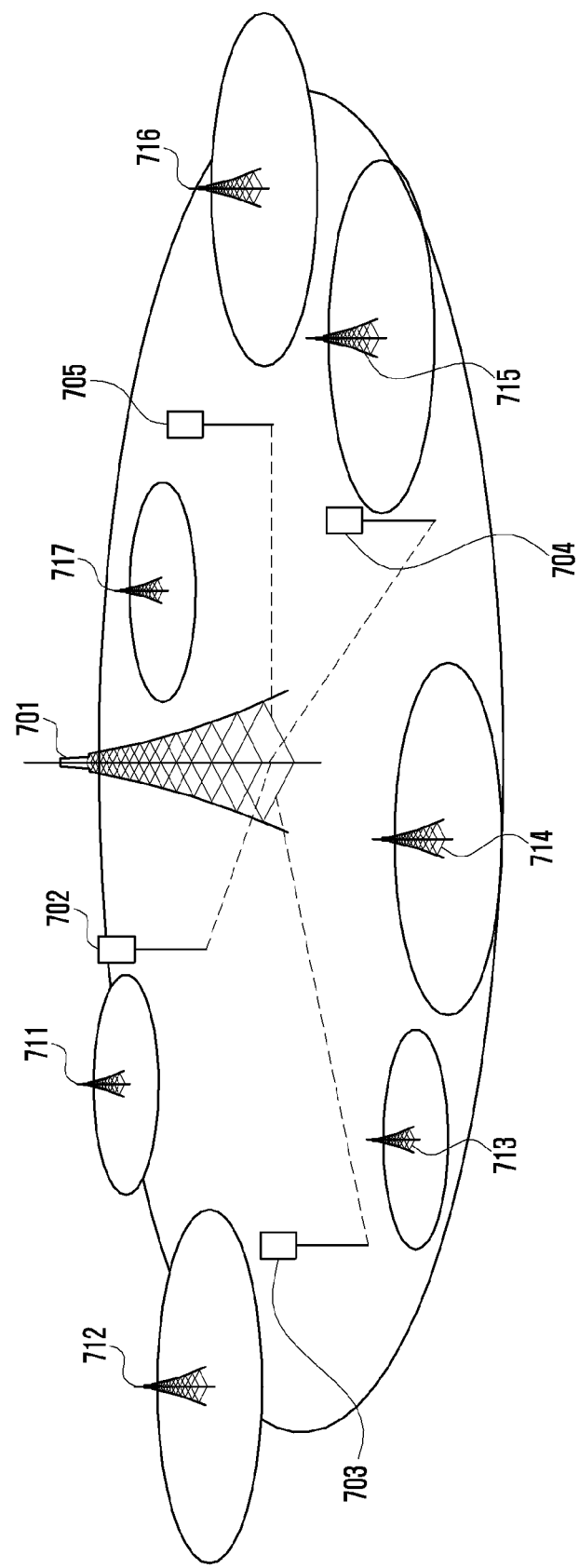
FIG. 9 is a diagram illustrating a DAS-based mobile communication system in which a plurality of small cells are distributed in a macro cell according to an embodiment of the present invention.

FIG. 9 is a diagram illustrating a DAS-based mobile communication system in which a plurality of small cells is distributed in a macro cell according to an embodiment of the present invention.

In the mobile communication system of FIG. 9, a small cell has a service area about 10~200 m while the macro cell has a service area of a few km. Due to the demand for the mobile data services, the mobile carriers are focusing on the small cell technology as a measure of offloading data or removing coverage holes such as repeater or Access Point (AP) for distributing traffic. The small cell is deployed inside or outside of a building to extend the radio coverage or increase the network throughput.

Referring to FIG. 9, a macro cell includes a high power antenna 701 and four low power antennas 702, 703, 704, and 705. There are seven small cells in the macro cell and the small cells perform radio communication using respective small cell antennas 711, 712, 713, 714, 715, 716, and 717.

If there is a plurality of small cells in a macro cell as shown in FIG. 9, this may cause an IMR shortage for respective antenna groups.

Referring to FIG. 2, since the legacy LTE/LTE-A Rel. 11 allows for configuring 10 IMRs (A to J) in the radio resource structure of one resource block and one subframe, it is possible to allocate IMR for 10 antennas in the cell.

In the mobile communication system of FIG. 9, however, a total of 12 IMRs are necessary, i.e. 5 IMRs for the high power antenna 701 and the low power antennas 702, 703, 704, and 705, and 7 IMRs for the small cell antennas 711, 712, 713, 714, 715, 716, and 717. If the radio resource structure of the legacy LTE/LTE-A Rel. 11 which allows for up to 10 IMRs is applied, some antenna groups or small cell antennas have to use IMRs at the same positions, resulting in incorrect interference measurement. As a consequence, the terminal calculates and reports an inaccurate SIR, and the base station performs AMC based on the incorrect SIR, whereby the downlink transmission is performed at a data rate inappropriate for the channel condition. Also, due to the influence of the terminal which has reported inaccurate channel state information, other terminals scheduled by the same base station fail to receive data at their optimal data rates, whereby the LTE/LTE-A system undergoes entire system performance degradation, as well as throughput degradation, between the base station and the terminal which has reported the inaccurate channel state information.

In order to solve the above problem, the present invention provides an IMR allocation method for NCT.

In NCT, when a subcarrier is not used for other purposes in two consecutive OFDM symbols, it can be used for IMR. A description is made of two embodiments of allocating IMR for NCT. Although the description is directed to the embodiments of the resource structure similar to that of the conventional technology to reuse and facilitate the conventional technology and accomplish the advantages of reduction of development cost, the present invention is not limited thereto, but includes other embodiments of resource structures fulfilling the condition for IMR in NCT.

1. First embodiment: Structure for IMR in CRS subframe
2. Second embodiment: Structure for IMR along with new DMRS structure Although the description is directed to the cases where the IMR is allocated in two consecutive OFDM symbols, it is also possible to allocate IMR in a single OFDM symbol depending on the IMR allocation format. In this case, if the subcarrier is not used for other purposes in NCT, IMR is allocated by OFDM symbols according to the technical concept of the present invention. All of the following embodiments are applicable to the case where IMR is allocated by OFDM symbol.

First Embodiment

The first embodiment of the present invention provides an IMR structure in a CRS subframe.

Figure 10:
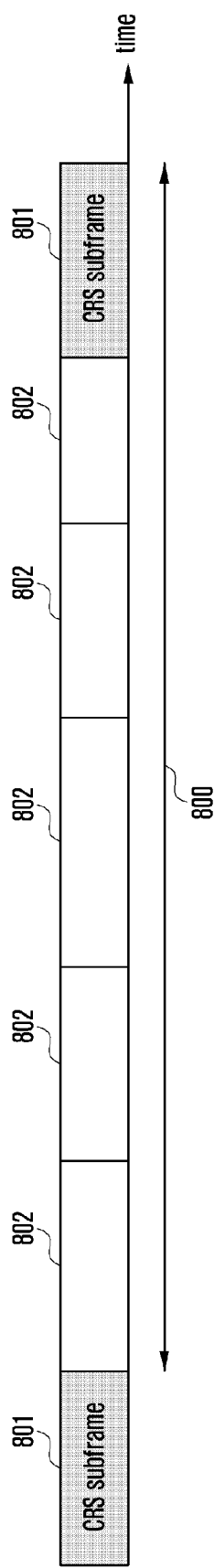
FIG. 10 is a diagram illustrating the arrangement of subframes with and without CRS in the time domain.

FIG. 10 is a diagram illustrating the arrangement of subframes with and without CRS in the time domain.

Referring to FIG. 10, the radio resource for NCT may be comprised of the subframes carrying CRS and the subframes not carrying CRS.

The base station sends the terminal the CRS subframes 801 and non-CRS subframes 802 through the antennas. In detail, the base station transmits the CRS subframes 801 at a predetermined interval 800 and the non-CRS subframes 802 between the CRS subframes 801 as shown in FIG. 10.

In the following, the description is made of the allocation of IMR in the CRS subframe 801.

Figure 11A:
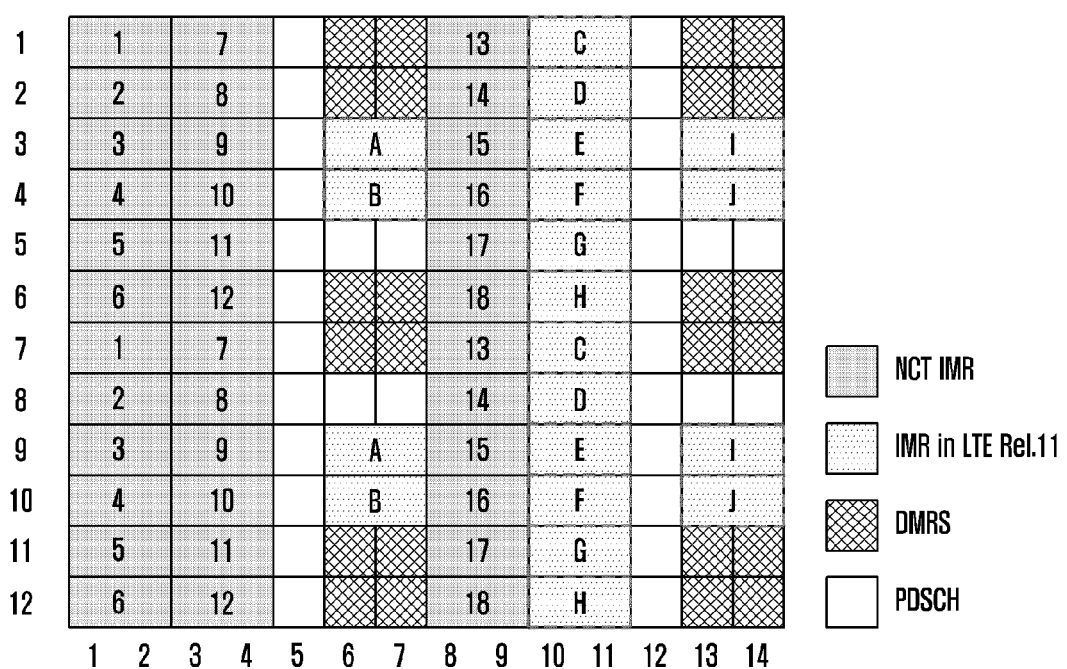
FIG. 11A is a diagram illustrating a resource structure for allocating IMR in a non-CRS subframe according to the first embodiment of the present invention.

FIG. 11A is a diagram illustrating a resource structure for allocating IMR in a non-CRS subframe according to the first embodiment of the present invention.

FIG. 11A shows the time-frequency resource grid of the non-CRS subframe 802. The basic unit of the radio resource for NCT is RB in the frequency domain and subframe in the time domain like the LTE/LTE-A system. The RB consists of 12 subcarriers, and the subframe consists of 14 OFDM symbols. The radio resource for NCT has no control channel.

According to the first embodiment of the present invention, in the non-CRS subframe, the REs to which no signal is mapped may be allocated for additional IMR. At this time, the IMR may be mapped to the two consecutive REs. All REs of the two consecutive OFDM symbols to which no other signals (e.g. CRS and DMRS) are mapped may be used as IMR. In this case, up to 18 IMRs can be further allocated as compared to the legacy LTE/LTE-A.

According to the first embodiment of the present invention, since there is no control region in the radio resource for NCT as shown in FIG. 11A, the first and second and the third and fourth OFDM symbols may be allocated for IMR. The fifth OFDM symbol cannot be allocated for IMR because the sixth and seventh OFDM symbols have DMRS and IMR specified in the current LTE/LTE-A. The eighth and ninth OFDM symbols may be allocated for IMR on all subcarriers because no other signal is mapped thereto. As a consequence, the first to fourth and eighth and ninth OFDM symbols of the non-CRS subframe for NCT can be allocated for IMR. Since the IMR allocated in this way is available for reuse of the conventional technology in such a way of shifting the IMR structure of the 10th and 12th OFDM symbols in the time domain, it is advantageous to implement the interference measurement method and apparatus for NCT with low implementation cost and a short implementation period.

Figure 11B:
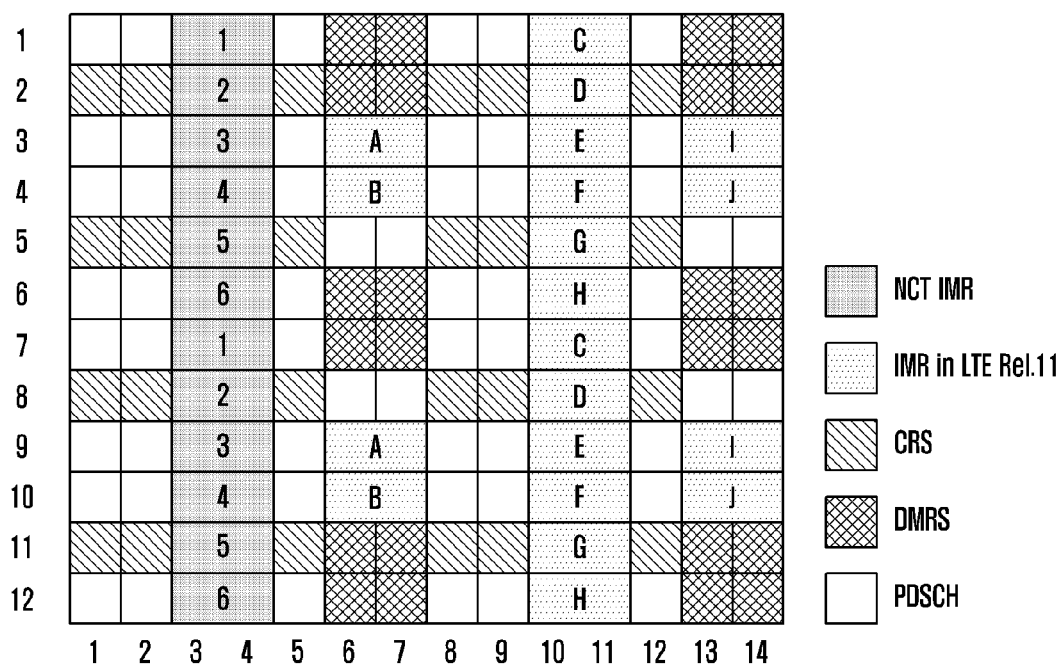
FIG. 11B is a diagram illustrating a resource structure for allocating IMR in a CRS subframe according to the first embodiment of the present invention.

FIG. 11B is a diagram illustrating a resource structure for allocating IMR in a CRS subframe according to the first embodiment of the present invention.

FIG. 11B shows the time-frequency resource grid of the CRS subframe 801. The basic unit of the radio resource for NCT is RB in the frequency domain and subframe in the time domain like the LTE/LTE-A system. The RB consists of 12 subcarriers, and the subframe consists of 14 OFDM symbols. The radio resource for NCT has no control channel.

According to the first embodiment of the present invention, it is possible to allocate the REs to which other signals including CRS are not mapped for additional IMR in the CRS subframe. At this time, the IMR may be allocated by two consecutive REs. That is, the first embodiment of the present invention provides the IMR having the structure of FIG. 11B to prevent the IMR from colliding with CRS in the CRS subframe.

In FIG. 11B, the CRS is transmitted at the 1st, 2nd, 5th, 8th, 9th and 12th OFDM symbols, and DMRS and legacy IMR are transmitted at the 6th, 7th, 10th, 11th, 13th, and 14th OFDM symbols and, thus, the new IMR may be mapped to the 3rd and 4th OFDM symbols. Since no other signal is mapped to the 3rd and 4th OFDM symbols, all of the REs on the 1st to 12th subcarriers at the 3rd and 4th OFDM symbols can be allocated for IMR, and the 1st and 7th subcarriers, the 2nd and 8th subcarriers, the 3rd and 9th subcarriers, the 4th and 10th subcarriers, the 5th and 11th subcarriers, and 6th and 12th subcarriers are paired for IMR, resulting in 6 additional IMRs. In the first embodiment, the IMRs mapped to the 3rd and 4th OFDM symbols are implemented advantageously in such a way of shifting the IMR structure of the 10th and 12th OFDM symbols specified in LTE/LTE-A.

Second Embodiment

The second embodiment provides an IMR structure in the subframe with a new DMRS. That is, the second embodiment provides the IMR structure for NCT when a new DMRS is added in addition to the legacy DMRS.

Figure 12A:
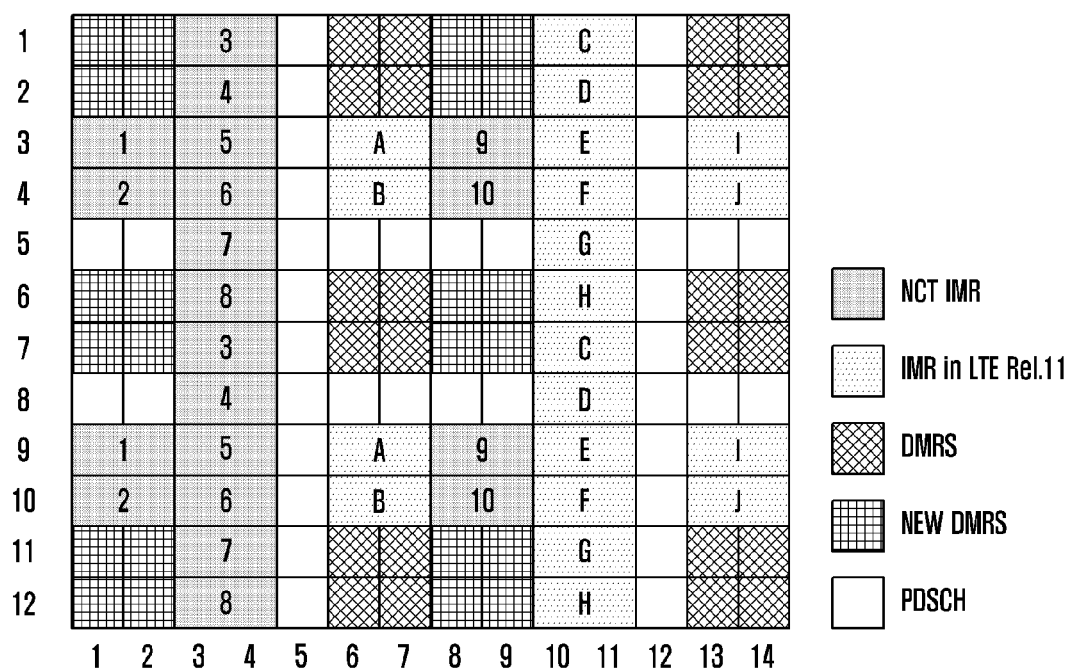
FIG. 12A is a diagram illustrating a resource structure for allocating IMR in the NCT subframe with the new DeModulation Reference Signal (DMRS) according to an embodiment of the present invention.

FIG. 12A is a diagram illustrating a resource structure for allocating IMR in the NCT subframe with the new DMRS according to an embodiment of the present invention.

Referring to FIG. 12A, the DMRS of the legacy LTE/LTE-A Rel. 11 exists on the 1st and 2nd subcarriers, the 6th and 7th subcarriers, and 11th and 12th subcarriers at the 6th and 7th OFDM symbols and 13th and 14th OFDM symbols, and the newly added DMRS exists on the 1st and 2nd subcarriers, the 6th and 7th subcarriers, and 11th and 12th subcarriers at the 1st and 2nd OFDM symbols and the 8th and 9th OFDM symbols. Also, the legacy IMR exists on the 3rd and 4th subcarriers and the 9th and 10th subcarriers at the 6th and 7th OFDM symbols and the 13th and 14th OFDM symbols, and the new IMR is arranged on all subcarriers at the 10th and 11th OFDM symbols.

In the second embodiment, the additional IMR is mapped to the REs which are not allocated for other signals including new DMRS in the radio resource for NCT. In FIG. 12A, the REs fulfilling the condition for IMR without collision with legacy signals exist on the 3rd, 4th, 9th, and 10th subcarriers at the 1st, 2nd, 8th, and 9th OFDM symbols, and on all of the subcarriers at the 3rd and 4th OFDM symbols.

Figure 12B:
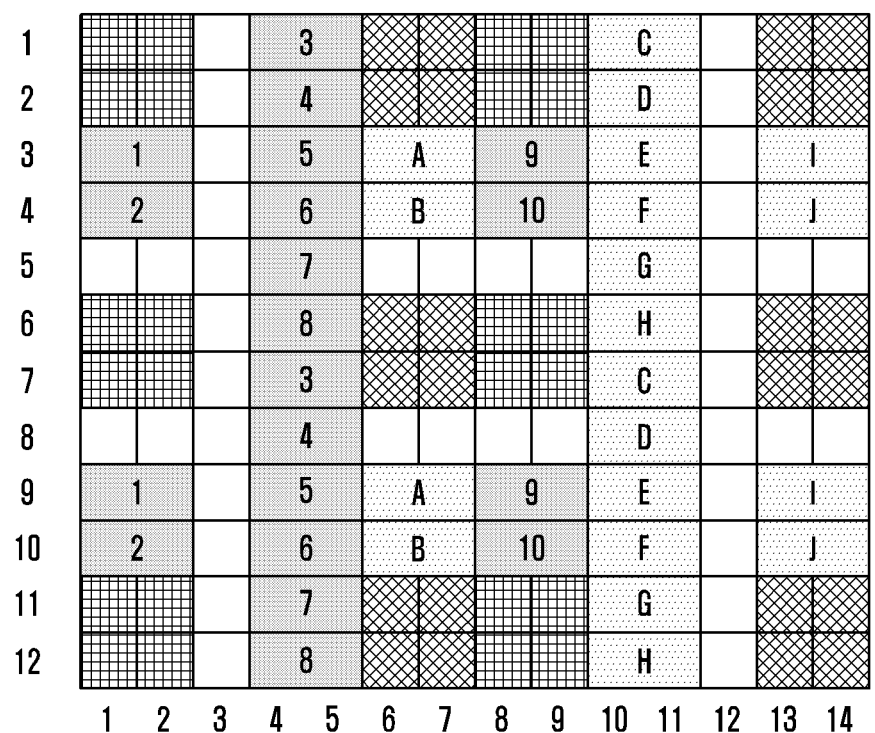
FIG. 12B is a diagram illustrating a resource structure for allocating IMR in the subframe with the new DMRS according to an embodiment of the present invention.

FIG. 12B is a diagram illustrating a resource structure for allocating IMR in the subframe with the new DMRS according to an embodiment of the present invention.

Referring to FIG. 12B, when the new DMRS is added in the radio resource for NCT, the IMR may be allocated such that the first and second slots of the subframe are symmetrical. As shown in FIG. 12B, the IMR is arranged at the 4th and 5th OFDM symbols rather than the 3rd and 4th OFDM symbols. In this case, the IMRs are arranged symmetrically along the boundary line between the 7th and 8th OFDM symbols in the time domain in the legacy LTE/LTE-A Rel. 11 IMR structure, thereby facilitating implementation.

Figure 13:
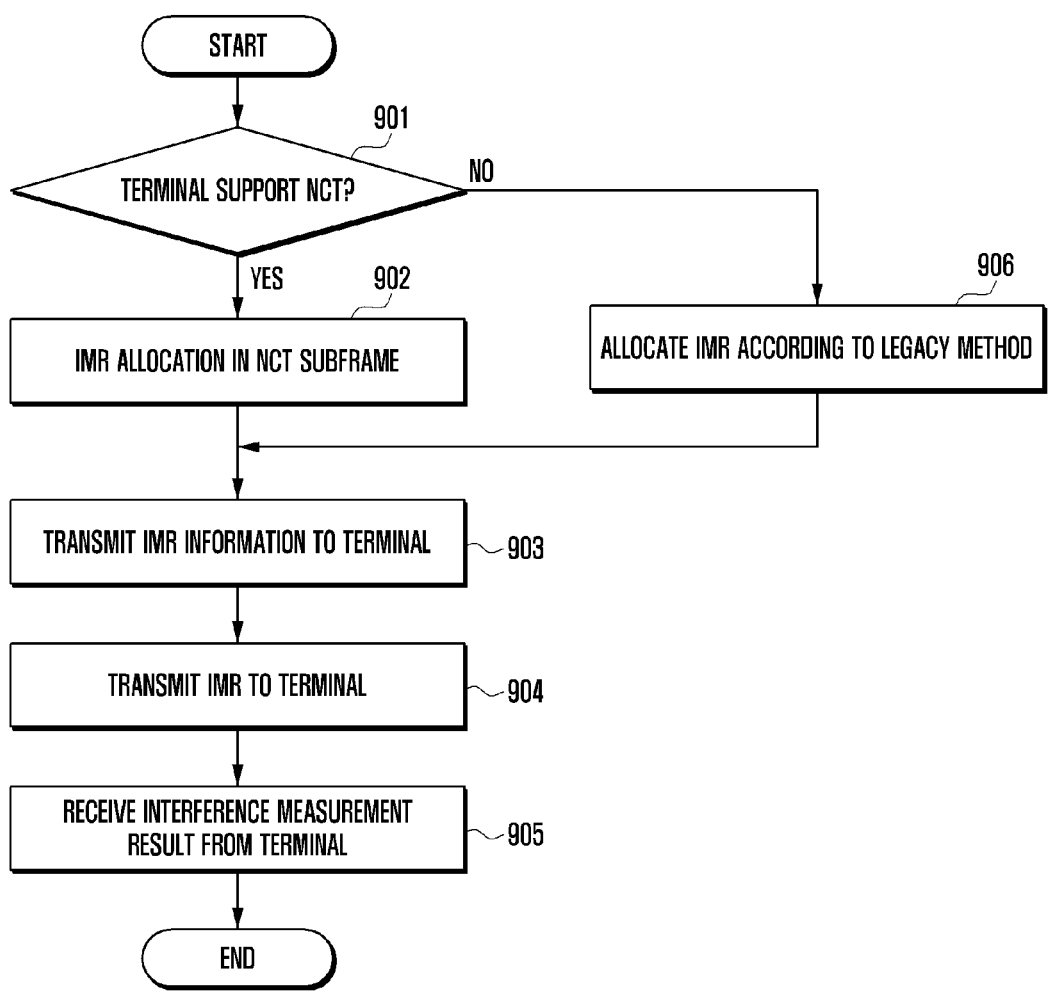
FIG. 13 is a flowchart illustrating the base station procedure for IMR configuration for NCT according to an embodiment of the present invention.

FIG. 13 is a flowchart illustrating the base station procedure for IMR configuration for NCT according to an embodiment of the present invention.

In FIG. 13, the base station determines whether the terminal supports NCT, i.e. whether the terminal can process an NCT subframe, at step 901. The base station may check this terminal capability through higher layer signaling or using other configuration information.

If the terminal does not support NCT, that is, is in a state incapable of supporting NCT, the base station allocates IMR in the subframe according to the legacy interference measurement method at step 906, and then proceeds to step 903. If the terminal supports NCT and is in a state capable of processing an NCT subframe in step 901, the base station allocates IMR (or interference measurement information) per antenna group in the NCT subframe in step 902. At this time, the IMR allocation can be performed as described with reference to FIGS. 11 and 12. The base station notifies the terminal of the interference measurement set for the IMR and the method for reporting the measured interference information at step 903. Next, in step 904 the base station transmits to the terminal the IMR muted as reported by the terminal such that the terminal is capable of measuring interference. Finally, the base station receives the interference measurement result based on the IMR from the terminal at step 905.

Figure 14:
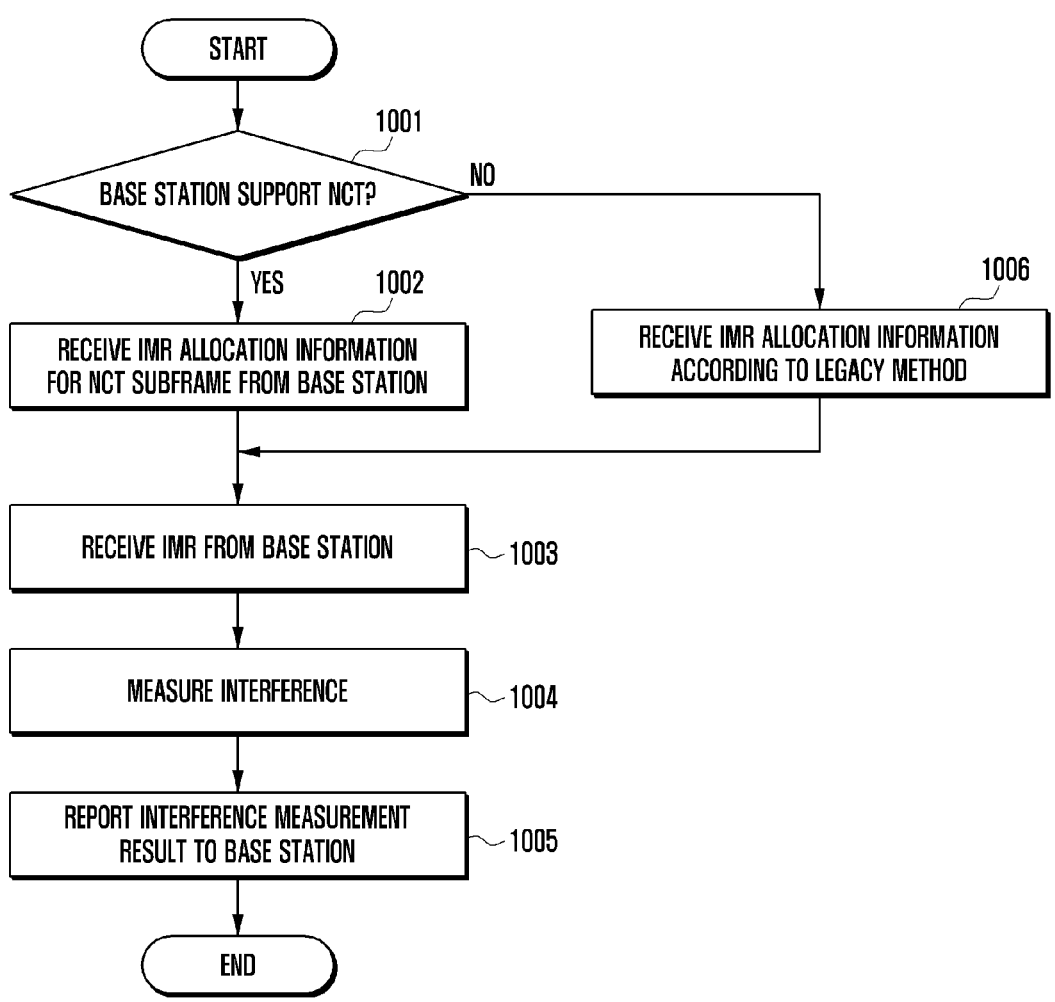
FIG. 14 is a flowchart illustrating the terminal procedure for interference measurement in NCT according to an embodiment of the present invention.

FIG. 14 is a flowchart illustrating the terminal procedure for interference measurement in NCT according to an embodiment of the present invention.

In FIG. 14, the terminal determines whether the base station supports NCT through higher layer signaling or using other configuration information in step 1001. If the base station does not support NCT, the terminal receives IMR allocation information from the base station according to the legacy IMR allocation method at step 1006, and then proceeds to step 1003. If the base station supports NCT in step 1001, the terminal receives the IMR allocation information for the NCT subframe at step 1002. The terminal then receives the subframe allocating the IMR based on the IMR allocation information at step 1003. Next, the terminal performs interference measurement on IMR at step 1004. Finally, the terminal generates channel state information based on the measured interference and reports the interference measurement result to the base station at step 1005.

Figure 15:
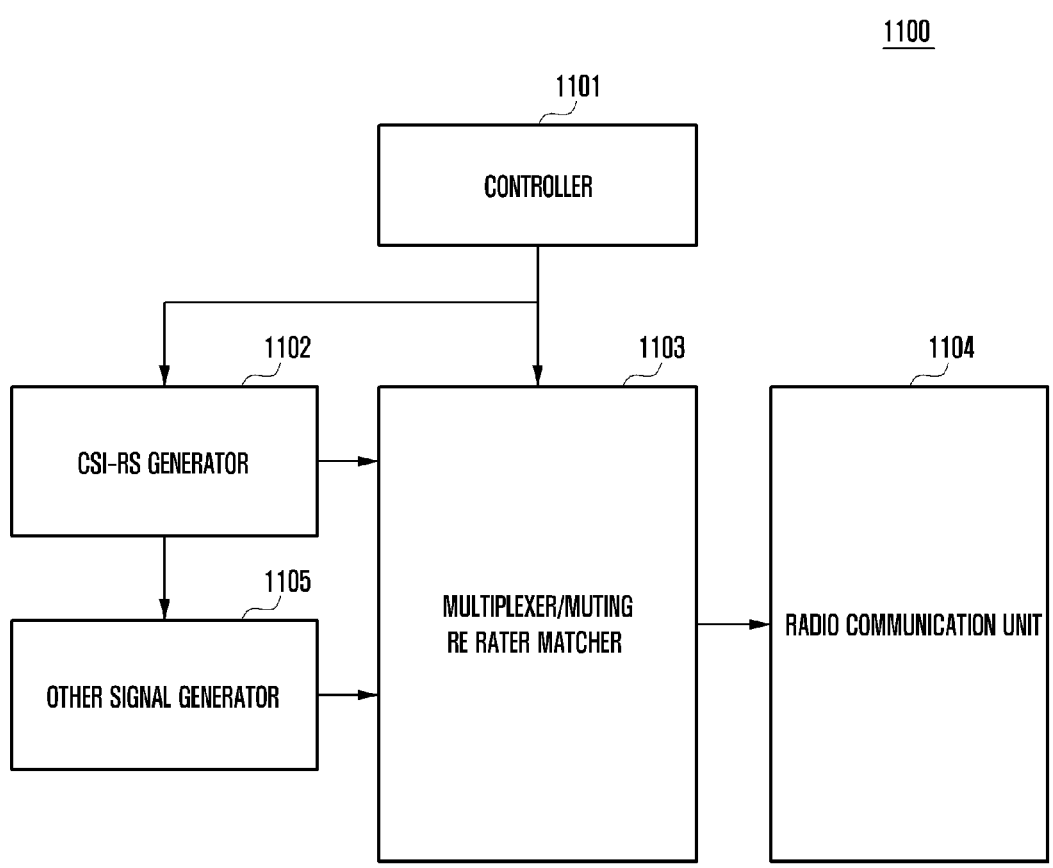
FIG. 15 is a block diagram illustrating a configuration of the base station for interference measurement according to an embodiment of the present invention.

FIG. 15 is a block diagram illustrating a configuration of the base station for interference measurement according to an embodiment of the present invention.

In FIG. 15, the controller 1101 of the base station 1100 controls the CSI-RS generator 1102 to generate CSI-RS for use in measuring the received signal strength per distributed antenna group. The CSI-RS generated by the CSI-RS generator 1102 is allocated per antenna group and input to the multiplexer/muting RE rate matcher 1103 along with other signals generated by another signal generator 1105.

If the terminal supports NCT-based communication, the controller 1101 determines whether to mute the CSI-RS REs allocated per antenna group for use as IMR. The controller 1101 also controls the multiplexer/muting RE rate matcher 1103 to multiplex the CSI-RSs or IMRs and controls the radio communication unit 1104 to transmit the multiplexed signal.

In more detail, the controller 1101 determines at least one antenna group for the terminal and CSI-RS for use in measuring the signal strength transmitted by the antenna group. The controller 1101 determines whether the terminal supports NCT and, if so, mutes the CSI-RS REs for use as IMR and controls the base station 1100 to notify the terminal of the interference measurement information on the antenna group in order for the terminal to measure the intra-cell interference and inter-cell interference. If the terminal does not support NCT, the controller 1101 controls the base station 1100 to transmit the legacy IMR or CSI-RS without muting. At this time, the controller 1101 controls the base station 1100 to transmit the above information to the terminal through higher layer signaling. The controller 1101 may detect the receipt of the interference information measured based on the interference measurement information from the terminal.

Figure 16:
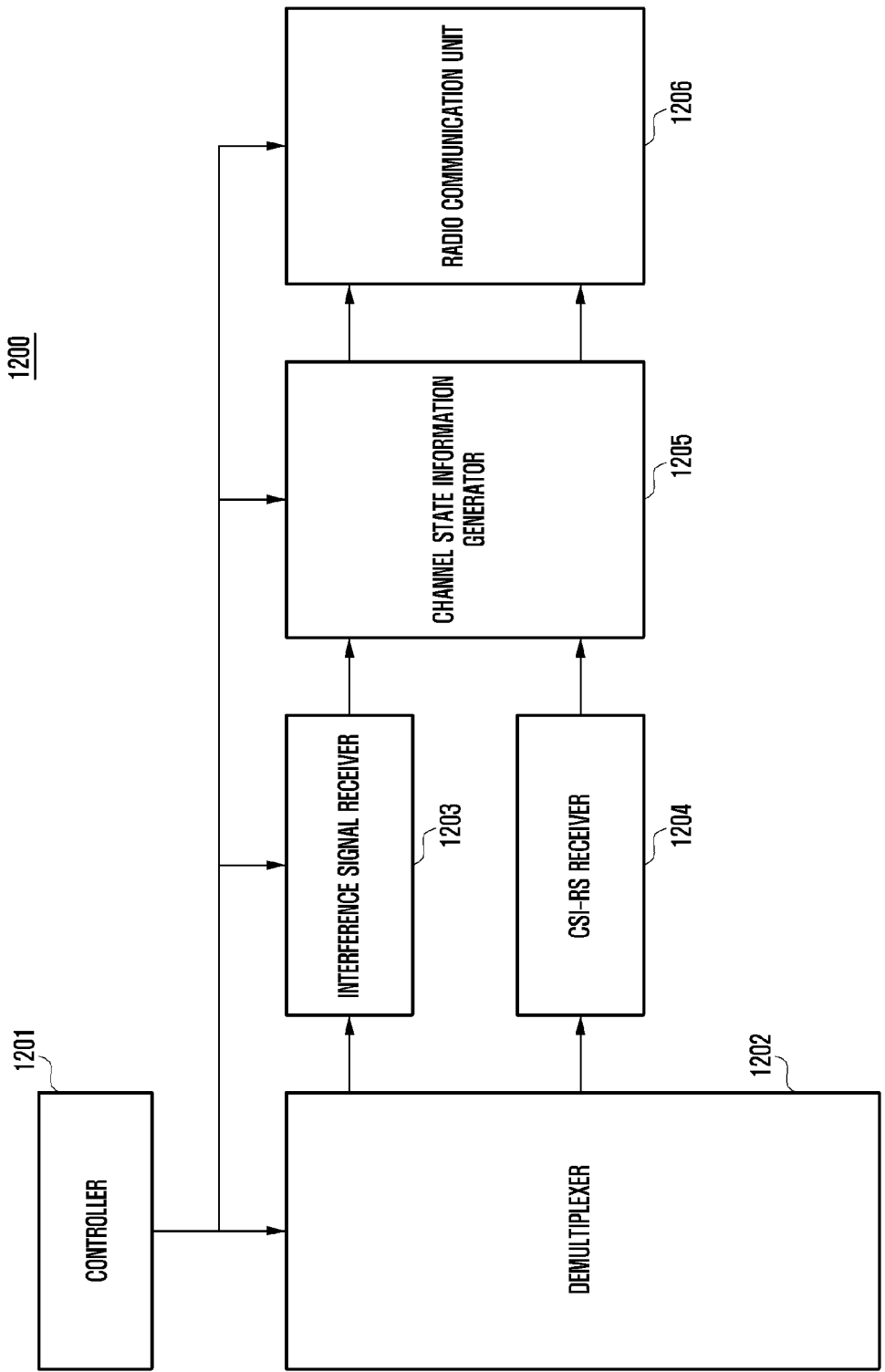
FIG. 16 is a block diagram illustrating a configuration of the terminal for interference measurement according to an embodiment of the present invention.

FIG. 16 is a block diagram illustrating a configuration of the terminal for interference measurement according to an embodiment of the present invention.

In FIG. 16, the controller 1201 of the terminal 1200 controls the terminal 1200 to receive information on whether the base station supports NCT and interference measurement information, measure interference based on the received interference measurement information, and generate channel state information using the measured interference.

In more detail, the controller 1201 controls the radio communication unit 1206 to receive the interference measurement information for used in measuring at least one of inter-cell interference and intra-cell interference for the reception antenna group of the terminal 1200. The controller 1201 also controls the radio communication unit 1206 to measure interference based on the received interference measurement information, generate channel state information using the measured interference, and transmit the channel state information to the base station.

In the case where the terminal 1200 performs NCT-based communication with the base station, the interference measurement information includes the information on the IMR transmission pattern or CSI-RS transmission pattern for the terminal 1200 to measure the intra-cell interference and inter-cell interference. The IMR transmission pattern may include a plurality of muting patterns for respective reception antenna groups.

The controller 1201 inputs the radio signal received from the base station to the demultiplexer 1202. The demultiplexer 1202 splits the signal received through the reception antenna groups into interference signals and other signals.

The interference signal received on the IMR allocated to the reception antenna groups is input to the interference signal receiver 1203 which measures the received signal strength. The received interference signal is input to the interference signal receiver 1203, which checks the size and characteristic of the interference. The interference signal receiver 1203 and the CSI-RS receiver 1204 input the received signal strength and the interference information to the channel state information generator 1205, which generates the channel state information to be transmitted to the base station based on feedback information received from the base station. The channel state information generated by the channel state information generator 1205 is input to the radio communication unit 1206 so as to be transmitted to the base station.

As described above, the interference measurement method and apparatus for NCT according to the present invention is advantageous in allocating interference measurement resources efficiently for NCT in a network environment where the macro cell exists with or without any small cell.

Also, the interference measurement method and apparatus for NCT according to the present invention uses the interference measurement resource structure in such a way of shifting the interference measurement resource structure in the time domain, thereby facilitating implementation and reducing implementation cost and period.

Although the description has been made with reference to particular embodiments, the present invention can be implemented with various modifications without departing from the scope of the present invention. Thus, the present invention is not limited to the particular embodiments disclosed, but includes the following claims and their equivalents.

What is claimed is:

1. An interference measurement configuration method of a base station transmitting subframes including, or not including, Cell-specific Reference Signals (CRS) in a wireless communication system, the method comprising:
   determining whether a terminal supports a New Carrier Type (NCT) subframe;
   allocating, when the terminal supports the NCT subframe, Interference Measurement Resources (IMR) to the terminal at Resource Elements (REs) where other signals are not mapped in the subframe;
   transmitting information on the allocated IMR to the terminal; and
   transmitting the subframe including the allocated IMR to the terminal.

2. The method of claim 1, wherein the IMR is allocated at the REs where other signals are not mapped when the subframe does not include the CRS.

3. The method of claim 1, wherein the IMR is allocated, when the subframe includes the CRS, at the REs where other signals including the CRS are not mapped.

4. The method of claim 1, wherein the IMR is allocated, when the subframe includes new DeModulation Reference Signals (DMRS), at the REs where other signals including the new DMRS are not mapped.

5. The method of claim 4, wherein the IMR is arranged symmetrically in a first slot and a second slot of the subframe.

6. An interference measurement method of a terminal receiving subframes including, or not including, Cell-specific Reference Signals (CRS) in a wireless communication system, the method comprising:
   determining whether a base station supports a New Carrier Type (NCT) subframe;
   receiving, when the base station supports the NCT subframe, information on Interference Measurement Resources (IMR) from the base station at Resource Elements (REs) where other signals are not mapped in the subframe;
   receiving the subframe including the allocated IMR from the base station;
   measuring interference using the IMR; and
   reporting a measurement report to the base station.

7. The method of claim 6, wherein the IMR is allocated at the REs where other signals are not mapped when the subframe does not include the CRS.

8. The method of claim 6, wherein the IMR is allocated, when the subframe includes the CRS, at the REs where other signals including the CRS are not mapped.

9. The method of claim 6, wherein the IMR is allocated, when the subframe includes new DeModulation Reference Signals (DMRS), at the REs where other signals including the new DMRS are not mapped.

10. The method of claim 9, wherein the IMR is arranged symmetrically in a first slot and a second slot of the subframe.

11. A base station for supporting interference measurement in a wireless communication system using subframes including, or not including, Cell-specific Reference Signals (CRS), the base station comprising:
   a radio communication unit which transmits and receives subframes to and from a terminal; and
   a controller configured to control determining whether a terminal supports a New Carrier Type (NCT) subframe, allocating, when the terminal supports the NCT subframe, Interference Measurement Resources (IMR) to the terminal at Resource Elements (REs) where other signals are not mapped in the subframe, transmitting information on the allocated IMR to the terminal, and transmitting the subframe including the allocated IMR to the terminal.

12. The base station of claim 11, wherein the controller allocates the IMR at the REs where other signals are not mapped when the subframe does not include the CRS.

13. The base station of claim 11, wherein the controller allocates, when the subframe includes the CRS, the IMR at the REs where other signals including the CRS are not mapped.

14. The base station of claim 11, wherein the controller allocates, when the subframe includes new DeModulation Reference Signals (DMRS), the IMR at the REs where other signals including the new DMRS are not mapped.

15. The base station of claim 14, wherein the controller arranges the IMR symmetrically in a first slot and a second slot of the subframe.

16. A terminal for measuring interference in a wireless communication system using subframes including, or not including, Cell-specific Reference Signals (CRS), the terminal comprising:
 a radio communication unit which transmits and receives subframes to and from a base station;
 a controller which controls determining whether a base station supports a New Carrier Type (NCT) subframe, receiving, when the base station supports the NCT subframe, information on Interference Measurement Resources (IMR) from the base station at Resource Elements (REs) where other signals are not mapped in the subframe, receiving the subframe including the allocated IMR from the base station, measuring interference using the IMR, and reporting a measurement report to the base station.

17. The terminal of claim 16, wherein the IMR is allocated at the REs where other signals are not mapped when the subframe does not include the CRS.

18. The terminal of claim 16, wherein the IMR is allocated, when the subframe includes the CRS, at the REs where other signals including the CRS are not mapped.

19. The terminal of claim 16, wherein the IMR is allocated, when the subframe includes new DeModulation Reference Signals (DMRS), at the REs where other signals including the new DMRS are not mapped.

20. The terminal of claim 19, the IMR is arranged symmetrically in a first slot and a second slot of the subframe.

* * * * *